United States Patent

[11] 3,572,768

| [72] | Inventor | David T. James<br>De Kalb, Ill. |
|---|---|---|
| [21] | Appl. No. | 786,644 |
| [22] | Filed | Dec. 24, 1968 |
| [45] | Patented | Mar. 30, 1971 |
| [73] | Assignee | Ideal Industries, Inc.<br>Sycamore, Ill. |

[54] TUBING CONNECTOR
10 Claims, 3 Drawing Figs.

[52] U.S. Cl. .................................................. 285/3,
285/382.2, 29/421, 285/351
[51] Int. Cl. ...................................................... F16l 13/14
[50] Field of Search ........................................... 285/3, 382,
382.1, 382.2, 256, 96, 97; 29/421 (E)

[56] References Cited
UNITED STATES PATENTS

| 2,083,842 | 6/1937 | Henning ................ | 285/3 |
| 3,023,995 | 3/1962 | Hopkins .................. | 285/97X |
| 3,055,095 | 9/1962 | Barry ...................... | 285/382.2X |
| 3,160,949 | 12/1964 | Bussey et al. ............ | 29/421(E) |
| 3,262,720 | 7/1966 | Briegel .................... | 285/382X |
| 3,429,587 | 2/1969 | Kish ......................... | 285/382.2X |
| 3,434,194 | 3/1969 | Whittaker et al. ........ | 29/421(E) |

FOREIGN PATENTS

| 766,741 | 1/1957 | Great Britain ............ | 421(E) |
| 1,247,774 | 8/1967 | Germany .................. | 256/ |

*Primary Examiner*—Thomas F. Callaghan
*Attorney*—Parker, Carter & Markey

ABSTRACT: A tubing connector having an explosion chamber adapted to grip the connector firmly to the tubing after a charge within the chamber is exploded. One form of the invention provides a ferrule on the connector so that expansion of the explosion chamber deforms the tubing wall into gripping contact with the ferrule. An annular sealing member may be provided between the ferrule and tubing wall, and the ferrule surface may be rippled. An O-ring seal may also be provided whereby the expanded chamber forces the seal into sealing engagement with the connector and tubing wall.

PATENTED MAR30 1971

3,572,768

INVENTOR.
David T. James.
BY Parker, Carter & Markey
Attorneys.

3,572,768

TUBING CONNECTOR

SUMMARY OF THE INVENTION

Various types of fittings are conventionally provided as an end connection for tubing, pipe and hose. These fittings may be attached to the tubular member by welding, soldering, brazing, built-in mechanical crimping devices and collars, crimp members applied by special tools, and the deformation of various tongs and claws, or by pins and snaprings or the like. Some of these fittings bear packing rings, glands and followers of various design. They are generally sized for a narrow range of tubular member diameters. Moreover, it requires a certain degree of skill and takes from moderate to extensive time to use these prior art connectors.

The present invention provides a tubing connector and method of connection which minimizes both the skill and time required to provide a satisfactory attachment, and also permits a given fitting to accommodate a relatively large range of tubular diameters, wall thicknesses, and materials.

Accordingly, it is an object of this invention to provide a tubing connector having an explosion chamber with a wall deformable into gripping contact with the tubing wall after explosion of a charge within the chamber.

Another object is to provide a tubing connector with an explosion chamber and ferrule adapted to clamp the tubing wall after explosion of a charge within the chamber.

Another object is to provide a tubing connector having an explosion chamber with an inner deformable wall movable against a tubing wall upon explosion of a charge within the chamber, a ferrule concentrically aligned with the chamber, and an annular sealing member to provide gripping and sealing features between the ferrule and tubing wall.

Another object is to provide a tubing connector having an annular explosion chamber disposed around the tubing wall and a ferrule concentric with the chamber and disposed within the tubing wall, the ferrule being provided with a rippled surface adjacent the tubing wall for improved gripping characteristics.

DETAILED DESCRIPTION

Figure 1:
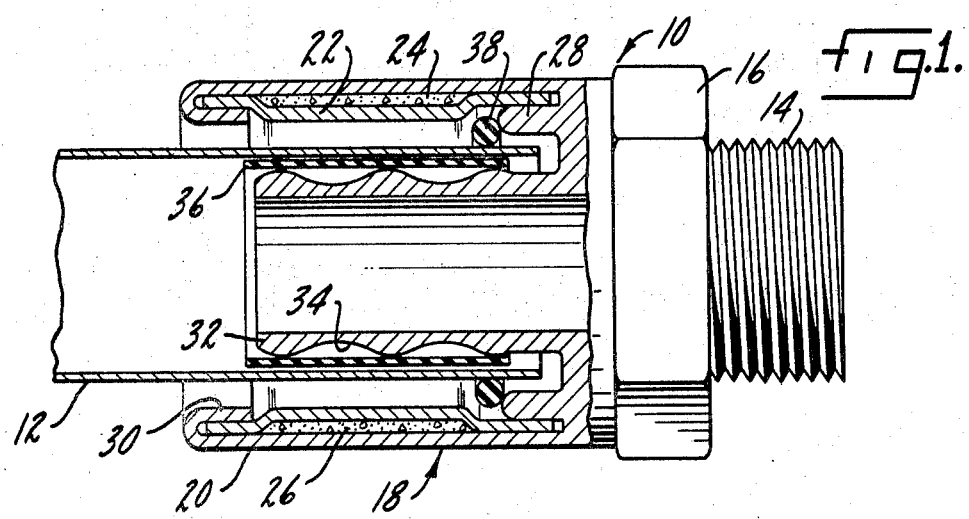
FIG. 1 is a longitudinal view in partial cross section illustrating a tubing connector incorporating features of the invention and showing the connector before firing of the explosive charge.

Referring now to the drawings and particularly FIG. 1, a tubing connector according to the invention is illustrated generally at 10. Connector 10 provides a fitting for connecting the end of metal tubing 12 in the desired manner by means of the external pipe threads 14. Connector 10 may also be used for connecting other items such as metal pipe or pipe, tubing and hose of other material such as plastic and elastomer, or a composite. The fitting illustrates an external thread 14, although it could be otherwise with internal threads or other suitable configurations for providing a connection. The hexagonal head 16 is provided on the fitting for a wrench to drive the threaded fitting into engagement with a mating fitting, although other suitable configurations could be provided for the same purpose.

Connector 10 is provided with an annular explosion chamber 18 disposed around tubing 12. The explosion chamber includes a relatively nondeformable outer wall or shell 20 and a deformable inner wall 22 spaced from the outer wall at its midsection to define the space 24 confining an explosive charge 26. The inner wall is secured to the fitting at its inner end by means of annulus 28 and at its outer end by means of pinched-in lip 30 of the outer wall.

Explosive charge 26 is preferably of the deflagrating type and can be gunpowder of the "double base" type which contains nitrocellulose and nitroglycerine, or it can be straight nitrocellulose. A detonating type of explosive may also be used, but this would require a thicker external wall 20 for the same amount of deformation of inner wall 22. Explosive combinations which may include detonating, deflagrating, and priming mixtures in various proportions or combinations may be used as dictated by end use, commercial, and manufacturing considerations. The amount of the explosive charge may be varied in accordance with the type or size of tubing 12, but the charge should be sufficient upon explosion to deform inner wall 22 into gripping contact with the tubing.

Explosion of the charge may be initiated by fire, heat, shock, electrical spark or conduction, friction, or by a primer or detonator actuated by mechanical, chemical or electrical means. For example, a primer, not shown, may be provided within the explosive 26 with a connection to a source of electrical energy by suitable wiring, not shown. The primer may comprise a high-resistance conductor which heats up upon passage of electrical current to ignite the explosive. Other types of primers which are well known to those skilled in the art may also be used with this invention.

A ferrule or inner support 32 provided on the fitting is positioned within the tubing wall 12. The invention also contemplates that the ferrule could be located outside of and surrounding the tubing wall with the explosion chamber and deformable member correspondingly located within the tubing. The ferrule allows the connector to work with relatively thin-walled tubing which otherwise would collapse under the force of the explosive charge.

Ferrule 32 also functions as an inner gripping surface for retaining the tubing wall against axial displacement. This provides a second gripping surface in addition to that provided by wall 22. Ferrule 32 may be formed with a rippled or uneven surface at 34 adjacent the inner surface of the tubing. As the explosion deforms the chamber's inner wall 22 inwardly against the tubing, tubing wall 12 will in turn be deformed against the ferrule and into the contours of ferrule surface 34. The resulting effective gripping action retains the tubing on connector 10 and, depending on the type of tubing and contacting materials, provides an effective fluid seal. Surface 34 may either be smooth surfaced, rippled, or otherwise deformed depending on the particular material employed or the gripping and sealing results desired.

To enhance the sealing and gripping action of the connection, annular seal member 36 may be provided between the ferrule and tubing. As the charge is expanded seal member 36 will deform into sealing contact between the tubing and ferrule. Additionally, an O-ring type seal 38 may be provided between the outer surface of tubing 12 in contact with annulus 28 of the connector. Deformation of wall 22 will press sealing ring 38 into sealing contact between the annulus and tubing.

Connector 10 may be used with a wide range of diameters, thicknesses, and materials of tubing or pipe. This results because inner wall 22 of the explosion chamber is adapted to deform radially inwardly a variable amount depending on the outer diameter of the tubing used. Accordingly, it is not necessary to provide a close fit of the tubing either within the explosion chamber or over ferrule 32. Thus, the connector may be used with tubing of different diameters and with varying resistance to radial deformation.

Figure 2:
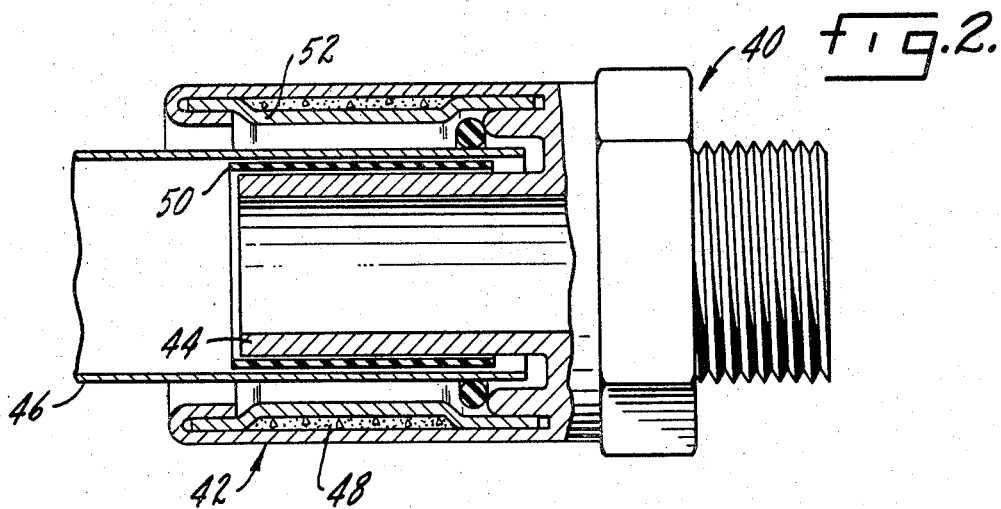
FIG. 2 is a view similar to FIG. 1 illustrating a modified form of the invention.

FIG. 2 illustrates another embodiment in which a connector 40 is provided with an explosion chamber 42 and ferrule 44 adapted to grip tubing 46 after explosion of charge 48 within the chamber. In this modification ferrule 44 has a relatively smooth outer cylindrical surface. An annular sealing member 50 may be provided between the ferrule and inner surface of the tubing. Deformation of inner wall 52 by the explosion will inwardly deform the adjacent section of tubing 46 against sealing member 50 and the ferrule.

Connector 40 with the straight surfaced ferrule 44 will find application in those instances where the compressive grip of deformable wall 52 against tubing 46 will provide adequate retention against axial displacement of the tubing from the fitting. The frictional gripping capability of the connection will vary with the type of material of the tubing, sealing member 50, and inner wall 52.

Figure 3:
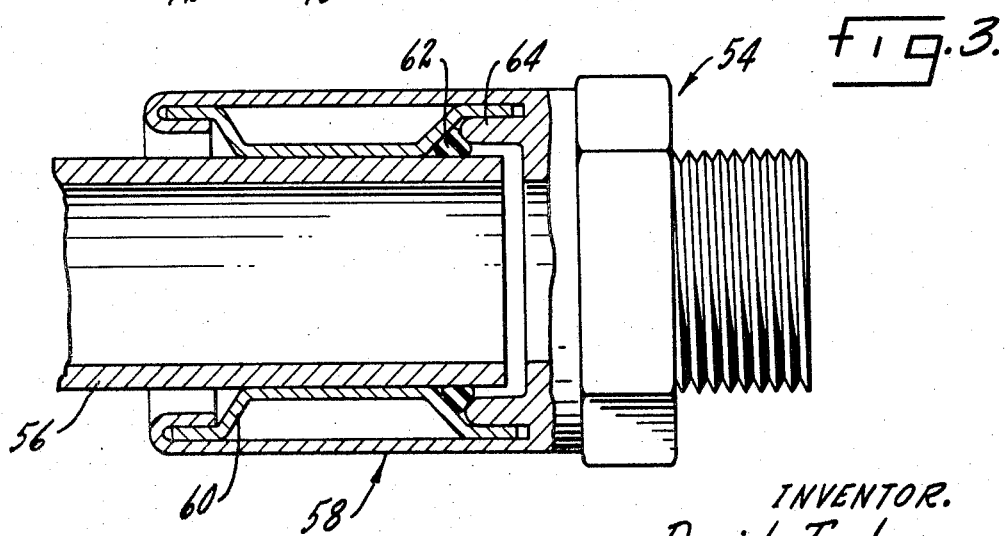
FIG. 3 is a view similar to FIG. 1 illustrating another modified form of the invention showing the connector after firing of the explosive charge.

FIG. 3 illustrates another embodiment of a connector fitting 54 used with a tubing or pipe 56 in which the tubing wall is relatively nondeformable as a result of stronger wall material or greater thickness, or both. In this illustration the parts are shown as they would appear after the charge in explosion chamber 58 has exploded.

Connector 54 is formed without an inner ferrule as the tubing 56 is of sufficient strength and rigidity so that it is not appreciably deformed by inner wall 60 after the charge is exploded. In this modification frictional engagement of wall 60 alone retards axial displacement of the tubing from the connector. An O-ring type seal 62 may be provided between tubing 56, wall 60 and connector annulus 64 in those applications where fluidtight sealing is important. In case where the required deformation of wall 60 to engage tubing 56 is limited and the design is not required to cover a wide range of tubing sizes, a metal-to-metal fluidtight seal between the tubing, wall 60, and annulus 64 can be attained. Where the characteristics of the materials of tubing 56 and wall 60 do not lend themselves to effective fluid sealing, a tubular sealing member, not shown, may be provided between the tubing and explosion chamber as in the embodiments of FIGS. 1 and 2.

Some irregularity of tubing shape such as hexagonal instead of round could be accommodated for some uses, but in such case sealing would be more difficult to achieve.

It would be understood that various changes in the details, materials and arrangement of parts, which have been described and illustrated in order to explain the nature of the invention, may be made by those skilled in the art within the principle and scope of the invention as expressed in the appended claims.

I claim:

1. An explosion connector attachable to a tubular member comprising the combination of:
    a body member having a connecting fitting;
    an explosion chamber connected with the body member and expandable into circumferential gripping relationship with the tubular member;
    explosive means within the chamber to expand the chamber; and
    said chamber being annularly disposed around the outside of the tubular member and including a relatively nondeformable outer wall and a relatively deformable inner wall in which the inner wall is deformed into gripping relationship with the tubular member upon actuation of the explosive means.

2. The invention of claim 1 and further including an annular seal between the chamber and the tubular member whereby expansion of the chamber forces the seal into sealing engagement between the chamber and tubular member.

3. The invention of claim 1 and further including an O-ring seal positioned between the chamber and tubular member and in abutting relationship with the body member whereby deformation of the inner wall forces the seal into sealing engagement with the tubular member and body member.

4. The invention of claim 1 wherein the tubular member is deformable, and the body member includes a ferrule aligned along the tubular member on the opposite side from the chamber.

5. The invention of claim 4 wherein the ferrule is positioned inside of the tubular member whereby expansion of the chamber forces the tubular member into gripping relationship with the ferrule.

6. The invention of claim 4 wherein the ferrule surface adjacent the tubular wall is formed with an uneven surface and the tubular member is deformed into conforming relationship with the ferrule surface.

7. The invention of claim 6 wherein the ferrule surface is rippled.

8. The invention of claim 4 and further including an annular seal positioned between the ferrule and tubular member.

9. The invention of claim 6 and further including an annular seal positioned between the ferrule and tubular member, said seal conforming to the ferrule surface.

10. The invention of claim 4 and further including an O-ring seal positioned between the chamber and tubular member and in axial abutment with the body member whereby expansion of the chamber forces the O-ring seal into sealing engagement with the tubular member and body member.